(12) United States Patent
Swinford et al.

(10) Patent No.: US 6,709,024 B1
(45) Date of Patent: Mar. 23, 2004

(54) METHOD AND APPARATUS FOR ASSEMBLING COUPLINGS FOR TRANSFERRING FLUIDS

(75) Inventors: Mark Douglas Swinford, Centerville, OH (US); Antonio Salas Gonzalez, Beavercreek, OH (US); Mark Allen Rich, Urbana, OH (US); Michael Ralph Storage, Beavercreek, OH (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 09/670,999

(22) Filed: Sep. 27, 2000

(51) Int. Cl.$^7$ ................................................. F16L 21/02
(52) U.S. Cl. ........................ 285/233; 285/369; 285/261
(58) Field of Search ......................... 285/31, 233, 369, 285/370, 261

(56) References Cited

U.S. PATENT DOCUMENTS

| 10,617 | A | * | 3/1854 | Young | 285/397 |
|---|---|---|---|---|---|
| 951,704 | A | * | 3/1910 | Schmidt | 285/370 |
| 2,323,823 | A | * | 7/1943 | Markey | 285/146.3 |
| 2,804,559 | A | * | 8/1957 | Brewer | 310/254 |
| 3,414,299 | A | * | 12/1968 | Roe | 285/234 |
| 3,596,934 | A | * | 8/1971 | DeCenzo | 285/233 |
| 3,787,079 | A | * | 1/1974 | Yorke | 285/233 |
| 4,066,281 | A | * | 1/1978 | De Bonis | 285/31 |
| 4,150,847 | A | * | 4/1979 | De Cenzo | 285/93 |
| 4,303,103 | A | * | 12/1981 | Marks et al. | 138/97 |
| 4,475,750 | A | * | 10/1984 | Campbell | 285/370 |
| 4,522,433 | A | * | 6/1985 | Valentine et al. | 285/93 |
| 4,676,241 | A | * | 6/1987 | Webb et al. | 128/207.14 |
| 5,106,129 | A |  | 4/1992 | Camacho et al. |  |
| 5,354,104 | A |  | 10/1994 | Senes et al. |  |
| 5,507,535 | A | * | 4/1996 | McKaney et al. | 285/370 |
| 5,772,254 | A |  | 6/1998 | Felber et al. |  |
| 6,059,323 | A |  | 5/2000 | Ekholm et al. |  |
| 6,179,339 | B1 |  | 1/2001 | Vila |  |
| 6,193,192 | B1 |  | 2/2001 | Porte |  |

* cited by examiner

Primary Examiner—Eric K. Nicholson
(74) Attorney, Agent, or Firm—Nathan D. Herkamp; Armstrong Teasdale LLP; Robert B. Reeser, III

(57) ABSTRACT

A coupling used to transfer fluid between two conduits includes a seal arrangement that permits an inner sleeve to move axially and angularly without fluid leaking from the coupling. The coupling also includes a pair of coupling members coupled to the inner sleeve, around each end of the inner sleeve. The inner sleeve includes tapered ends sized to receive a seal including a spherical lip. Each coupling member includes a tapered end that compresses each seal during assembly of the coupling. The seal spherical lips maintain sealable contact between the inner sleeve and the coupling first and second members.

20 Claims, 2 Drawing Sheets

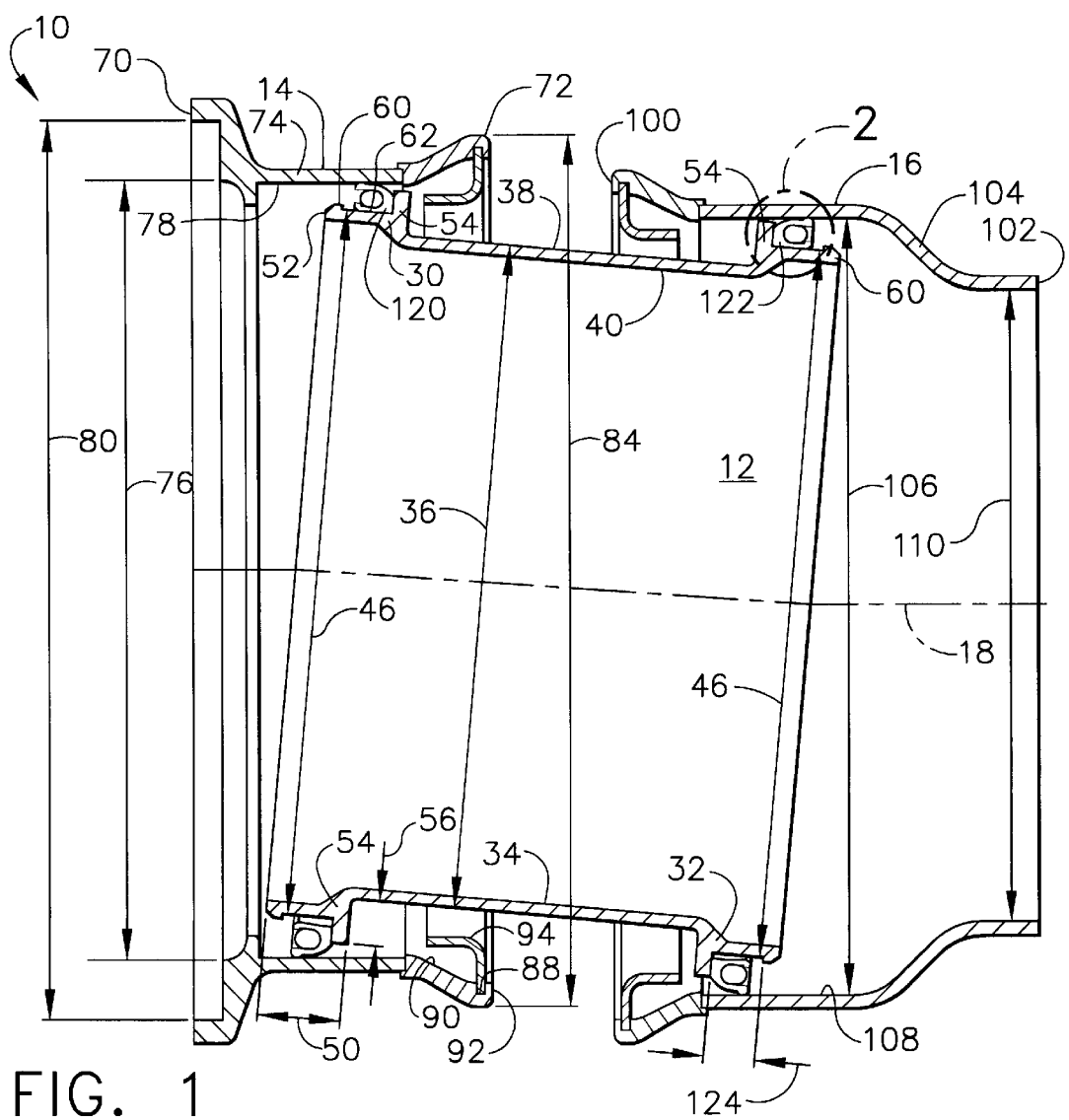
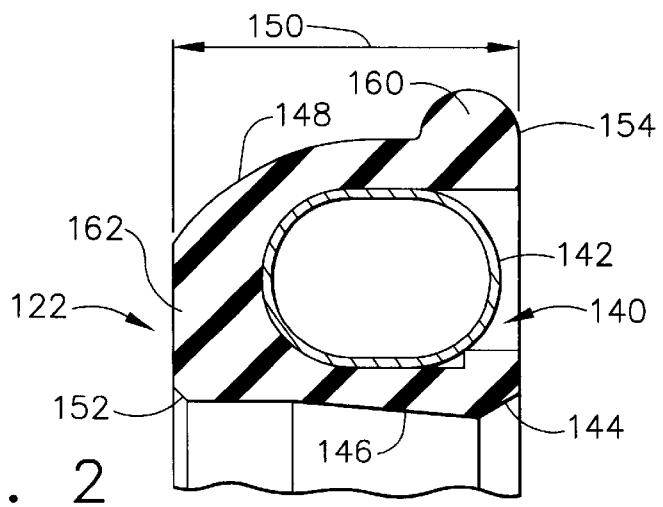

METHOD AND APPARATUS FOR ASSEMBLING COUPLINGS FOR TRANSFERRING FLUIDS

BACKGROUND OF THE INVENTION

This application relates generally to couplings and, more particularly, to a couplings used to transfer fluids between two conduits within gas turbine engines.

Because of heat generated during operation, gas turbine engines often include flexible couplings for transferring fluids, especially cooling air, between conduits. Such couplings permit misalignment of mating hardware during installation, and permit the conduits to thermally expand during engine operation. One type of known coupling includes a metallic inner cylindrical sleeve including spherically formed ends. The sleeve is supported for axial and angular movement within the coupling with a pair of coupling members. The coupling members attach to the sleeve and each member includes an end containing carbon sleeves.

The carbon sleeves include inner bores that permit the carbon sleeves to contact the spherical ends of the sleeve to prevent fluid from leaking from the coupling between the inner sleeve and the coupling members. Because the carbon sleeves have a lower coefficient of thermal expansion in comparison to the metallic inner sleeve, the inner sleeve may expand to a greater degree than the carbon sleeve. Over time, such continued thermal expansion may lead to excessive wear of the carbon sleeves and leakage of the coupling. Over time, eventually the seals may erode completely and metal to metal contact between the sleeves may occur. Such contact potentially increases vibrations within the coupling which may in-turn lead to a failure of the coupling. Because the carbon sleeves are not serviceable, the couplings must then be replaced to prevent the coupling from leaking.

To minimize replacement of the entire coupling, other known types of couplings include replaceable seals. These couplings include a combination of a split seal and a continuous seal for sealing around each end of the inner sleeve. See for example U.S. Pat. No. 5,106,129. The assembly of such seals is complex because the continuous seal is mounted on a silicone based o-ring to provide radial pressure to the inner bore and the split seal is mounted on a split metallic ring which is further mounted on a metallic wave spring. Each end of the inner spring is retained in a joint end with a retaining ring inserted within a groove extending into the joint end. To insert the seals into the grooves, unique tools are used to radially compress the seals. During each engine cycle, temperature differences existing between an engine's casing and the conduits may cause the casing to thermally expand a greater amount than the conduit. This in turn may cause the coupling ends to move relative to the inner sleeve. Additionally, angular movement of the joint may occur because of the temperature differences between the casing and the conduits. Because the o-rings provide only a small amount of radial restitution, as the continuous seals wear, their effectiveness is reduced. As the split seals wear, leakage may occur, and the split seals are forced radially outward to compensate for the wear and reduce the leakage. However, these seals typically have a nominal flow leakage through the split seal.

BRIEF SUMMARY OF THE INVENTION

In an exemplary embodiment, a coupling used to transfer fluid from one conduit to another conduit includes a seal arrangement that permits an inner sleeve to move axially and angularly, relative to the conduits, without fluid leaking from the coupling. The coupling also includes a pair of coupling members coupled to the inner sleeve to support the inner sleeve. The inner sleeve includes tapered ends including retaining grooves sized to receive a seal. Each coupling member includes a tapered end sized to compress each inner sleeve seal during assembly of the coupling. The seals each include a spherical lip that is outwardly biased to provide sealable contact between the inner sleeve and the coupling first and second members.

During operation, as the inner sleeve moves axially or angularly, the seal lips ensure that sealable contact is maintained between the inner sleeve and the coupling first and second members. Such an assembly facilitates eliminating fluid leakage from the coupling, and because the coupling members include tapered ends, assembly of the coupling is simple.

BRIEF DESCRIPTION OF THE DRAWINGS

FIG. 1 is a cross-sectional view of a flexible coupling;

FIG. 2 is an enlarged cross-sectional view of a seal member taken along area 2 shown in FIG. 1;

DETAILED DESCRIPTION OF THE INVENTION

Figure 3:
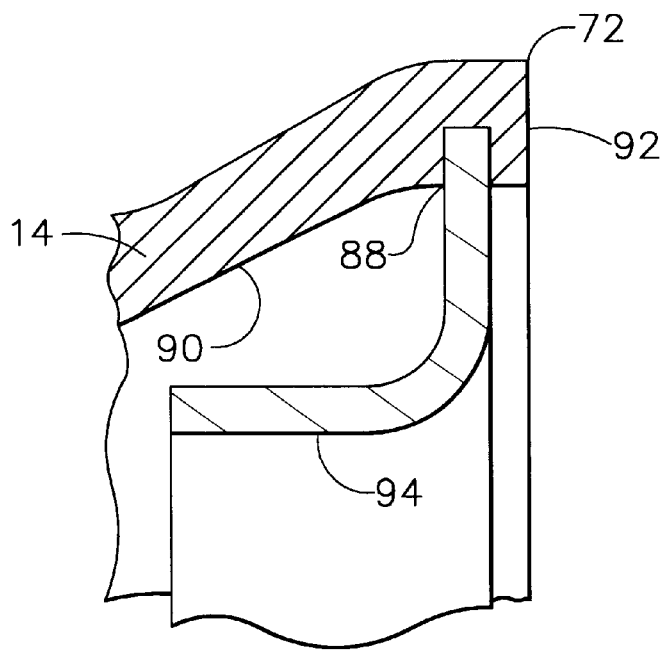
FIG. 3 is an enlarged cross-sectional view of a retainer taken along area 3 shown in FIG. 1.

FIG. 1 is a cross-sectional view of a flexible coupling 10 used to transfer fluid under pressure from a first conduit (not shown) to a second conduit (not shown). In one embodiment, coupling 10 is used to transfer fluids within gas turbine engines, such as, but not limited to, a CF6 engine available from General Electric Company, Cincinnati, Ohio. In one embodiment, coupling 10 is used to transfer cooling air within a gas turbine engine. Coupling 10 includes an inner sleeve 12 coupled between a hollow first member 14 and a hollow second member 16. An axis of symmetry 18 extends between first member 14 and second member 16. Because inner sleeve 12 is permitted to move axially with respect to first and second members 14 and 16, respectively, and angularly with respect to axis of symmetry 18, coupling 10 is considered flexible with respect to the conduits.

Inner sleeve 12 has a bore 22 therethrough, and includes a first end 30, a second end 32, and a body 34 extending therebetween. In one embodiment, inner sleeve 12 is metallic and is fabricated from, but not limited to, stainless steel. Body 34 is substantially cylindrical and has a diameter 36 measured with respect to an outer surface 38 of inner sleeve 12. Outer surface 38 extends over first end 30, body 34, and second end 32. Body first diameter 36 is constant between first end 30 and second end 32. Inner sleeve 12 also includes an inner surface 40 that extends between first end 30 and second end 32.

Inner sleeve first end 30 extends from inner sleeve body 34 and is outwardly tapered from axis of symmetry 18 and with respect to inner sleeve body 34. Accordingly, inner sleeve first end 30 has a diameter 46 that is larger than inner sleeve body diameter 36. In an alternative embodiment, inner sleeve first end 30 is not outwardly tapered from axis of symmetry 18 and first end diameter 46 is not larger than inner sleeve body diameter 36. Inner sleeve first end 30 tapers outwardly from inner sleeve body 34 a distance 50 from an outer edge 52 of inner sleeve 12.

An annular projection 54 extends radially outward from inner sleeve outer surface 38. More specifically, projection 54 extends outwardly from inner sleeve first end 30 a distance 56 and is substantially perpendicularly to inner sleeve outer surface 38. Projection 54 is distance 50 from inner sleeve outer edge 52.

An annular lip 60 also extends radially outward from inner sleeve outer surface 38. Annular lip 60 is adjacent inner sleeve outer edge 52. In one embodiment, annular lip 60 is formed as a result of machining inner sleeve outer surface 38 around inner sleeve tapered first end 30. A retaining groove 62 is defined between annular projection 54 and annular lip 60.

Inner sleeve 12 is symmetrical and inner sleeve second end 32 is identical to inner sleeve first end 30. Specifically, inner sleeve second end 32 extends from inner sleeve body 34 and is outwardly tapered to diameter 46. In an alternative embodiment, inner sleeve second end 32 is not outwardly tapered. Additionally, inner sleeve second end 32 also includes annular projection 54 and annular lip 60.

In an exemplary embodiment, coupling first member 14 is substantially cylindrical and includes a first end 70, a second end 72, and a body 74 extending therebetween. First member body 74 has a diameter 76. Diameter 76 extends across first member body 74 between inner surfaces 78 of first member body 74. First member diameter 76 is larger than inner sleeve body outer diameter 36 and inner sleeve first and second end diameters 46. Accordingly, first member body 74 is sized to receive inner sleeve 12.

Coupling first member first end 70 tapers outwardly from first member body 74 to permit coupling with the first conduit. Alternatively, coupling second member 16 couples with the first conduit. In one embodiment, the first conduit is a 4.0 inch diameter tube. Coupling first member first end 70 has a diameter 80 that is larger than body diameter 76. In the exemplary embodiment, first member first end 70 mechanical couples with the first conduit using mating hardware (not shown), such as, but not limited to V-flange type hardware. In an alternative embodiment, first member first end 70 is welded to the first conduit. In another alternative embodiment, first member first end 70 permits a face seal connection to be made with the first conduit.

Coupling first member second end 72 tapers outwardly from first member body 74 to a diameter 84 to permit coupling with inner sleeve 12. Second end diameter 84 is larger than coupling first member body diameter 76. In the exemplary embodiment, first member second end 72 is attached to first member body 74 with welding. In an alternative embodiment, first member second end 72 is integrally machined into coupling first member 14.

Coupling first member second end 72 includes an annular groove 88 extending into an inner surface 90 of first member second end 72. Groove 88 is adjacent an outer edge 92 of coupling first member second end 72 and is sized to receive a retainer 94. Retainer 94 limits an amount of axial travel or angulation of inner sleeve 12 between coupling first member 14 and coupling second member 16. In one embodiment, retainer 94 is an annular one-piece retainer (not shown). In the exemplary embodiment, retainer 94 is a split snap ring sized to insert within second end groove 88 and curved to extend towards coupling first member first end 70. In an alternative embodiment, retainer 94 includes a frusto-conical spacer (not shown in FIG. 1) to limit an amount of travel of inner sleeve 12.

In the exemplary embodiment, coupling second member 16 is substantially cylindrical and includes a first end 100, a second end 102, and a body 104 extending therebetween. In an alternative embodiment, coupling second member 16 is identical with coupling first member 14. Second member body 104 has a diameter 106 measured with respect to an inner surface 108 of second member body 104. Second member body diameter 106 is larger than inner sleeve body outer diameter 36 and inner sleeve first and second end diameters 46. Accordingly, second member body 104 is sized to receive inner sleeve 12.

Second member body 104 tapers inwardly to permit coupling with the second conduit. In one embodiment, the second conduit is a 2.5 inch tube. Body 104 extends to second member second end 102 such that second member second end 102 has a diameter 110 smaller than second member body diameter 106. In the exemplary embodiment, second member second end 102 couples mechanically with the second conduit using a welding connection. In an alternative embodiment, second member second end 102 is integrally machined into coupling second member 16. In another alternative embodiment, second member second end 102 permits mechanical coupling with the second conduit using mating hardware, such as, but not limited to, V-type flanges. In a second alternative embodiment, second member second end 102 attaches with a face seal connection to the second conduit.

Coupling second member first end 100 tapers outwardly from second member body 104 to couple with inner sleeve 12. In the exemplary embodiment, coupling second member first end 100 is identical coupling first member second end 72 and is attached to second member body 104 with welding. Accordingly, coupling second member first end 100 includes annular groove 88, retainer 94, and has diameter 84.

A pair of seals 120 and 122 permit inner sleeve 12 to be coupled in sealable contact with first and second members 14 and 16, respectively. Seals 120 and 122, described in more detail below, are identical and are between inner sleeve outer surface 38 and first and second member body inner surfaces 78 and 108, respectively. More specifically, seal 120 is between inner sleeve first end 30 and first member body 74, and seal 122 is between inner sleeve second end 32 and second member body 104.

Seals 120 and 122 permit inner sleeve 12 to move axially between first and second members 14 and 16 and to angulate with respect to coupling axis of symmetry 18 while maintaining sealable contact between respective coupling members 14 and 16, and inner sleeve 12. Seals 120 extend circumferentially around inner sleeve 12 and are constrained position around inner sleeve 12 between inner sleeve annular projections 54 and annular lips 60 within retaining groove 62. Groove 62 has a width 124 extending between projection 54 and lip 60 that is slightly wider than a free state diameter (not shown) of seals 120 and 122.

During assembly of coupling 10, initially seals 120 and 122 are installed circumferentially around each respective inner sleeve end 30 and 32 such that each seal 120 and 122 snaps over each annular lip 60 and is constrained within retaining groove 62. Because retaining groove width 124 is slightly larger than the seal free state diameter, a lip (not shown in FIG. 1) of each seal 120 and 122 is not damaged during assembly. Inner sleeve annular projections 54 ensure seals 120 and 122 are positioned within retaining groove 62 and maintain seals 120 and 122 in an axial position relative to inner sleeve outer edge 52.

Each end 30 and 32 of inner sleeve 12 is then inserted into a respective first and second member 14 and 16. More specifically, inner sleeve first end 30 is inserted within coupling first member tapered second end 72 and inner sleeve second end 32 is inserted within coupling second member tapered first end 100. As each end 30 and 32 is inserted, tapered ends 72 and 100, respectively, circumferentially compress each seal 120 and 122, respectively, and permit each seal 120 and 122 to remain in sealable contact between inner sleeve outer surface 38 and first and second member inner surfaces 78 and 108.

Retainers 94 are then installed within first and second member grooves 88 to prevent seals 120 and 122 from emerging from beneath first and second ends 72 and 100. Coupling 10 is then attached between the first and second conduits.

During operation, as engine hardware thermally expands, coupling inner sleeve 12 is permitted to move axially and to angulate between the first and second conduits. As inner sleeve 12 moves axially and/or angularly, seals 120 and 122 remain in sealable contact to prevent leakage from escaping from coupling 10. When inner sleeve 12 is translated axially or angulates, retainers 94 contact inner sleeve annular projections 54 to limit an amount of axial movement and angulation of inner sleeve 12 between first and second coupling members 14 and 16. Additionally, because inner sleeve 12 may move axially and angularly between first and second members 14 and 16, the first and second conduits may be aligned non-concentrically relative to each other and coupling 10 may still be used to couple the first and second conduits for transferring fluid.

FIG. 2 is an enlarged cross-sectional view of seal 122 taken along area 2 shown in FIG. 1. Seal 122 is a spring energized seal. In one embodiment, seal 122 is a spring energized fluoropolymer seal available from American Variseal Corporation, Broomfield, Colorado. Seal 122 is identical to seal 120 (shown in FIG. 1) and each includes a spring cavity 140, a coil 142, and a retaining surface 144. Retaining surface 144 defines spring cavity 140 and coil 142 is positioned within spring cavity 140.

Retaining surface 144 includes a substantially U-shaped body 146 including an outer surface 148. Body 146 has free state width 150 measured between a closed side edge 152 and an opening side edge 154. Width 150 is less than retaining groove width 124 (shown in FIG. 1).

Outer surface 148 includes a wiper lip 160 and a rounded shoulder 162. Wiper lip 160 and rounded shoulder 162 function in combination to ensure seal 120 maintains sealing contact with respective coupling first and second members 14 and 16 (shown in FIG. 1) despite axial or angular movement of inner sleeve 12 (shown in FIG. 1), thus facilitating an elimination of leakage between inner sleeve 12 and each coupling member 14 and 16. Wiper lip 160 is substantially spherical-shaped and is adjacent opening side edge 154. Wiper lip 160 has a diameter 164 that is slightly larger than first member body diameter 76 and second member body diameter 106. Because wiper lip diameter 164 is larger than body diameters 76 and 106, wiper lip 160 maintains sealable contact with respective coupling first and second members 14 and 16 despite axial or angular movement of inner sleeve 12.

During assembly of coupling 10 (shown in FIG. 1), seals 120 and 122 are installed circumferentially around inner sleeve 12 such that each seal 120 and 122 is oriented within a respective retaining groove 124 such that each retaining surface closed side edge is adjacent annular projection 54 (shown in FIG. 1).

FIG. 3 is an enlarged cross-sectional view of retainer 94 taken along area 3 shown in FIG. 1. Coupling first member second end 72 includes annular groove 88 extending into first member second end inner surface 90. Groove 88 is adjacent coupling first member second end outer edge 92 and is sized to receive retainer 94. Retainer 94 limits an amount of axial travel or angulation of inner sleeve 12 (shown in FIG. 1) between coupling first member 14 and coupling second member 16 (shown in FIG. 1). In one embodiment, retainer 94 is an annular one-piece retainer (not shown). In the exemplary embodiment, retainer 94 is a split snap ring sized to insert within second end groove 88 and curved to extend towards coupling first member first end 70 (shown in FIG. 1).

Retainers 94 are then installed within first and second member grooves 88 to prevent seals 120 and 122 (shown in FIGS. 1 and 2) emerging from beneath first and second ends 72 and 100 (shown in FIG. 1). Coupling 10 is then attached between the first and second conduits (not shown).

Figure 4:
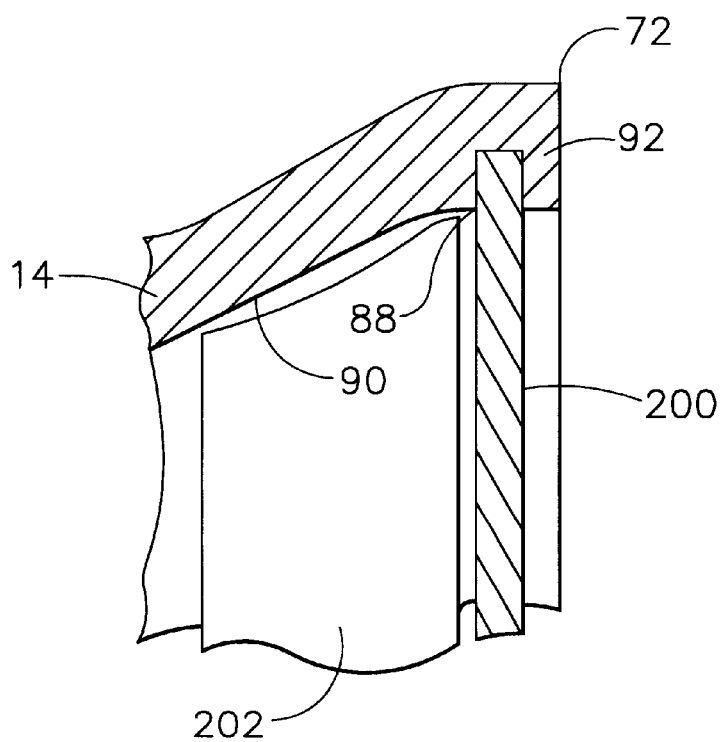
FIG. 4 is an enlarged alternative embodiment of the retainer shown in FIG. 3.

FIG. 4 is an enlarged cross-sectional view of an alternative embodiment of a retainer 200 that may be used with coupling 10 shown in FIG. 1. Coupling first member second end 72 includes annular groove 88 extending into first member second end inner surface 90. Groove 88 is adjacent coupling first member second end outer edge 92 and is sized to receive retainer 94. Retainer 200 limits an amount of axial travel or angulation of inner sleeve 12 (shown in FIG. 1) between coupling first member 14 and coupling second member 16 (shown in FIG. 1).

Retainer 200 extends from groove 88 substantially perpendicularly to axis of symmetry 18 (shown in FIG. 1) and is adjacent a frusto-conical spacer 202. Spacer 202 is between retainer 200 and annular projection 54 (shown in FIG. 1) to limit an amount of travel of inner sleeve 12 (shown in FIG. 1).

During assembly, spacers 202 are installed within first and second member grooves 88 and then retainers 200 are installed to prevent seals 120 and 122 (shown in FIGS. 1 and 2) from emerging from beneath first and second ends 72 and 100 (shown in FIG. 1). Coupling 10 is then attached between the first and second conduits (not shown).

The above-described coupling is cost-effective and highly reliable. The coupling includes an inner sleeve including tapered ends. A single seal circumscribes each inner sleeve tapered end and each seal includes a spherical lip. The seal spherical lips permit the inner sleeve to remain in sealable contact within the coupling members despite axial or angular movement of the inner sleeve relative to the coupling members. As a result, fluid leakage from the coupling in comparison to known couplings is reduced. Furthermore, because each coupling member includes a tapered end, each seal is automatically compressed as the coupling is assembled. As a result, assembly of the coupling is simplified in comparison to known coupling assemblies. Thus, a coupling is provided which is cost-effective and highly reliable.

While the invention has been described in terms of various specific embodiments, those skilled in the art will recognize that the invention can be practiced with modification within the spirit and scope of the claims.

What is claimed is:

1. A method of assembling a coupling used to transfer fluid from a first conduit to a second conduit, the coupling including a sleeve, a first member, and a second member, the sleeve including an outwardly tapered first end, an outwardly tapered second end, and a body extending therebetween, the first member including a tapered first end, a tapered second end, and a body extending therebetween, at least one of said first end and said second end having a diameter greater than a diameter of said body, the second member including an outwardly tapered first end, said method comprising the steps of:

coupling the first member to the sleeve tapered first end through the first member tapered first end such that the sleeve and first member are in sealable contact, wherein the sleeve body has an external surface, an internal surface, and a substantially constant external diameter between the sleeve tapered first and second ends; and coupling the second member to the sleeve tapered second end through the second member tapered first end such that the sleeve and second member are in sealable contact.

2. A method in accordance with claim 1 wherein said step of coupling the first member tapered first end further comprises the step of inserting the sleeve within the first member tapered first end.

3. A method in accordance with claim 1 wherein said step of coupling the second member tapered first end further comprises the step of inserting the sleeve within the second member tapered first end.

4. A method in accordance with claim 1 wherein the sleeve tapered first end includes a groove sized to receive a seal member, the sleeve tapered second end includes a groove sized to receive a seal member, said step of coupling the first member tapered first end further comprises the step of inserting the sleeve within the first member tapered first end such that the sleeve seal member is circumferentially compressed.

5. A method in accordance with claim 1 wherein the sleeve tapered first end includes a groove sized to receive a seal member, the sleeve tapered second end includes a groove sized to receive a seal member, said step of coupling the second member tapered first end further comprises the step of inserting the sleeve within the second member tapered first end such that the sleeve seal member is circumferentially compressed.

6. A flexible coupling for transferring fluids between a first and a second conduit, said coupling comprising:

an inner sleeve comprising a first end, a second end, and a body extending therebetween, said body having an external surface, an internal surface, and a first diameter measured with respect to said external surface, said body first diameter substantially constant between said first and second ends, said first end outwardly tapered and having a second diameter, said second end outwardly tapered and having a third diameter;

a first cylindrical member coupled to said inner sleeve and comprising a tapered first end, a tapered second end, and a body extending therebetween, at least one of said first end and said second end having a diameter greater than a diameter of said body, and at least one of said first end and said second end having a diameter sized to receive at least one of said inner sleeve first end and said inner sleeve second end therein; and a second cylindrical member coupled to said inner sleeve and comprising a first end and a second end, at least one of said first end and said second end having a diameter sized to receive at least one of said inner sleeve first end and said inner sleeve second end.

7. A coupling in accordance with claim 6 wherein said inner sleeve first end tapered outwardly from said inner sleeve body such that said first end second diameter is larger than said body first diameter.

8. A coupling in accordance with claim 6 wherein said inner sleeve second end tapered outwardly from said inner sleeve body such that said second end third diameter larger than said body first diameter.

9. A coupling in accordance with claim 6 wherein said inner sleeve first end second diameter equals said inner sleeve second end third diameter, said second and third diameters larger than said body sleeve first diameter.

10. A coupling in accordance with claim 6 wherein said inner sleeve further comprises an outer surface, said inner sleeve first end identical said inner sleeve second end, each of said inner sleeve first and second ends further comprises an annular projection extending radially outward from said inner sleeve outer surface.

11. A coupling in accordance with claim 10 wherein said inner sleeve first and second ends further comprise an annular groove.

12. A coupling in accordance with claim 6 wherein at least one of said first cylindrical member first end and said first cylindrical member second end is outwardly tapered, at least one of said second cylindrical member first end and said second cylindrical member second end is outwardly tapered.

13. A coupling in accordance with claim 12 wherein said inner sleeve first and second ends further comprise an annular groove sized to receive a seal member, said first cylindrical member and said second cylindrical configured to circumferentially compress said inner sleeve seals as each said inner sleeve is received within said first and second cylindrical members.

14. A coupling for transferring fluids from a first conduit to a second conduit, said coupling comprising:

a sleeve comprising an outwardly tapered first end, an outwardly tapered second end, and a substantially cylindrical body extending therebetween, said body having an external surface, an internal surface, and a substantially constant external diameter between said tapered first and second ends;

a first member comprising a tapered first end, a tapered second end, and a body extending therebetween, at least one of said first end and said second end having a diameter greater than a diameter of said body, said first member coupled in sealable contact with said sleeve, and an outwardly tapered second end configured to couple in sealable contact with at least one of the first and second conduits; and a second member comprising a tapered first end, said second member coupled in sealable contact with said sleeve and a second end configured to couple in sealable contact with at least one of the first and second conduits.

15. A coupling in accordance with claim 14 wherein said sleeve first end comprises a groove sized to receive a first seal member, said sleeve second end comprises a groove sized to receive a second seal member.

16. A coupling in accordance with claim 15 wherein said first member is configured to circumferentially compress said seal member as said first member is coupled to said sleeve, said second member configured to circumferentially compress said seal member as said second member coupled to said sleeve.

17. A coupling in accordance with claim 15 further comprising an axis of symmetry extending from said first member through said sleeve to said second member, wherein said first and second seal members configured to limit an amount of angular movement of said sleeve within said first and second members relative to said axis of symmetry.

18. A coupling in accordance with claim 14 wherein said first member tapered first end sized to receive said sleeve therein, said second member tapered first end sized to receive said sleeve therein.

19. A coupling in accordance with claim 14 wherein said sleeve sized to be received within said first member and said second member, said first member tapered first end comprises a retainer configured to limit an amount of axial and angular movement of said sleeve within said first member, said second member tapered first end comprises a retainer configured to limit an amount of axial and angular movement of said sleeve within said second member.

20. A coupling in accordance with claim 14 further comprising an axis of symmetry, a first seal member between said sleeve and said first member, a second seal member between said sleeve and said second member, said sleeve configured to move angularly and axially relative to said axis of symmetry between said first member and said second member, said first seal member and said second seal member configured to maintain sealable contact between said sleeve and respective said first and second members during axial and angular movements of said sleeve.

* * * * *